United States Patent [19]

Wagensonner et al.

[11] Patent Number: 4,825,296

[45] Date of Patent: Apr. 25, 1989

[54] METHOD OF AND APPARATUS FOR COPYING ORIGINALS IN WHICH AN IMAGE TO BE PRINTED IS EVALUATED BY OBSERVING A CORRESPONDING LOW-RESOLUTION VIDEO IMAGE

[75] Inventors: Eduard Wagensonner, Aschheim; Hermann Fuchsberger, Ismaning; Wolfgang Ruf, Munich, all of Fed. Rep. of Germany

[73] Assignee: AGFA-Gevaert Aktiengesellschaft, Leverkusen, Fed. Rep. of Germany

[21] Appl. No.: 85,941

[22] Filed: Aug. 14, 1987

[30] Foreign Application Priority Data

Aug. 29, 1986 [DE] Fed. Rep. of Germany ....... 3629462

[51] Int. Cl.$^4$ .......................... H04N 1/40; H04N 1/46
[52] U.S. Cl. ...................................... 358/280; 358/76; 358/78
[58] Field of Search ...................... 358/75, 80, 27, 28, 358/29, 29 C, 36, 37, 39, 40, 76, 78, 280, 284

[56] References Cited

U.S. PATENT DOCUMENTS

| 4,468,693 | 8/1984 | Fujita et al. | 358/78 |
| 4,485,413 | 11/1984 | Furuta et al. | 358/78 |
| 4,598,282 | 7/1986 | Pugsley | 358/76 |
| 4,626,903 | 12/1986 | Giesche et al. | 358/80 |
| 4,639,769 | 1/1987 | Fleisher et al. | 358/27 |
| 4,661,843 | 4/1987 | Sekizawa et al. | 358/80 |
| 4,740,833 | 4/1988 | Shiota et al. | 358/80 |

FOREIGN PATENT DOCUMENTS

| 0123701 | 11/1984 | European Pat. Off. | |
| 0168818 | 1/1986 | European Pat. Off. | |
| 59-205875 | 11/1984 | Japan | 358/78 |
| 60-178787 | 9/1985 | Japan | 358/280 |

Primary Examiner—James J. Groody
Assistant Examiner—Randall S. Svihla
Attorney, Agent, or Firm—Peter K. Kontler

[57] ABSTRACT

An original to be copied is electrooptically scanned point-by-point. The resulting imaging signals are stored in a first memory and then forwarded to a first image processing unit where the signals are electronically corrected to enhance the image of the original. The corrected signals are loaded into a second memory. A portion of the corrected signals is recalled from the second memory and sent to a third memory. This portion of the corrected signals is then transmitted to a second image processing unit and thereafter converted into a low-resolution video image which can be inspected to determine image quality. If image quality is satisfactory, the contents of the second memory are sent to an exposure unit which prints a high-resolution image of the original on copy material. Imaging signals for a second original are loaded into the first memory as the contents of the second memory are recalled for printing. The second processing unit functions to adjust the video image so that it closely corresponds to the printed image of the original.

25 Claims, 1 Drawing Sheet

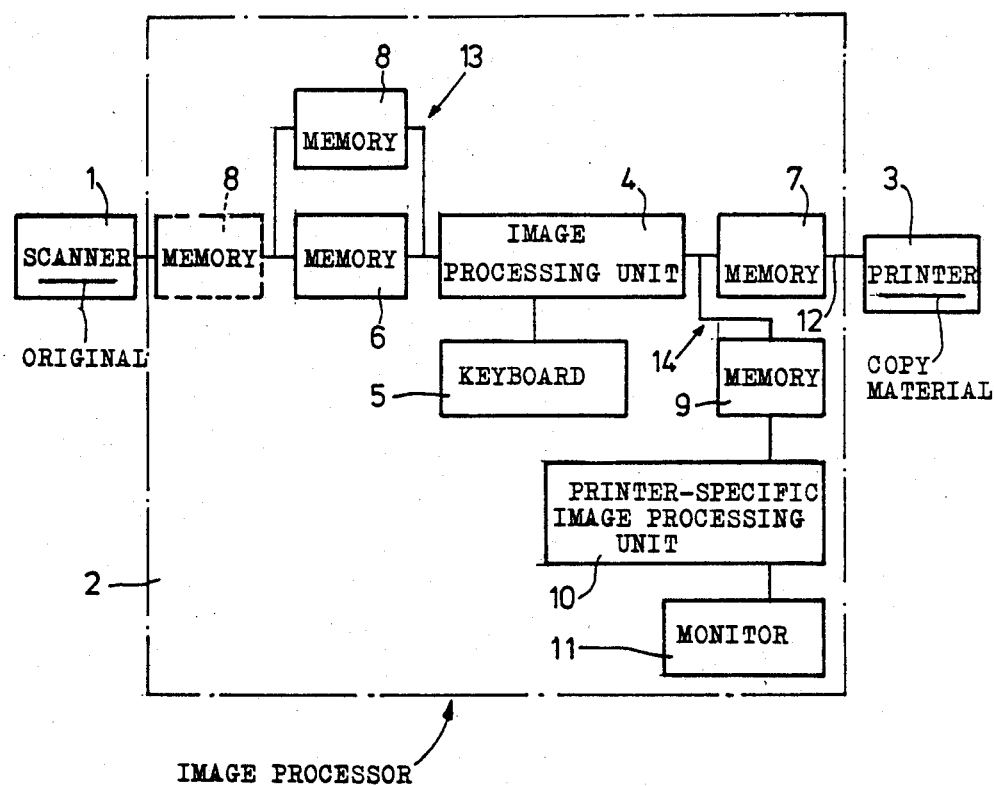

METHOD OF AND APPARATUS FOR COPYING ORIGINALS IN WHICH AN IMAGE TO BE PRINTED IS EVALUATED BY OBSERVING A CORRESPONDING LOW-RESOLUTION VIDEO IMAGE

BACKGROUND OF THE INVENTION

The invention relates generally to the reproduction of originals.

More particularly, the invention relates to a method and an apparatus for the reproduction of originals using electronic image processing.

In a known procedure for reproducing an original, the original is electrooptically scanned along rows and columns. The resulting imaging signals are electronically processed in an image processor to correct the same and the corrected imaging signals are then sent to a CRT (cathode-ray tube) printer. The latter prints an image of the original on photographic copy material.

Electronic image processing is being increasingly used in the reproduction of colored originals (positive-positive) and in the production of colored photographic positive images from colored negatives. See, for example, the European Patent Application Nos. 123,701 and 168,818. Basically electronic image processing is carried out by electrooptically scanning an original along rows and columns and correcting or modifying the resulting imaging signals in accordance with specific criteria. Scanning of the original is normally performed serially for the three primary colors red, green and blue (RGB). The modified imaging signals are sent to a color exposure unit designed to convert the electrical imaging signals into an optical image which is printed on photographic copy material, e.g., color positive paper. It is important here for conversion of the electrical imaging signals to be carried out such that the optical image is formed point-by-point. This makes it possible, in principle, for each image element or pixel to be subjected to image processing and to be subsequently printed on the copy material at a location corresponding to the coordinates of the image element or pixel on the original.

For a detailed description of the fundamentals of electronic image processing see, for instance, the following books: (i) F.M. Wahl, Digitale Bildverarbeitung, Springer Publishing House, Berlin, Heidelberg, N.Y., Tokyo (1984); and (ii) W.K. Pratt, Digital Image Processing, John Wiley & Sons, N.Y./Chichester/Brisbane/Toronto (1978).

In practice, economic considerations require color image reproduction systems to have high processing speeds. As a rule, the number of copies per hour exceeds 1000. Since an image is made up of approximately 1.5 million image elements or pixels and each pixel is commonly assigned a word length of 8 bits, there are 12 Mbits of data for each of the three color components red, green, blue. In total, then, 36 Mbits of data exist for a complete color image. It is clear that, which such a large quantity of data, the complicated operations which are carried out in the image processor to improve image quality have a marked influence on the processing time. The processing time for the entire color image reproduction system is determined by the following three basic operations: (a) scanning and reading in; (b) processing in the image processor; and (c) reproduction (color image printing). The time required for electronic image processing can be substantially reduced by employing a high-speed computer.

OBJECTS AND SUMMARY OF THE INVENTION

It is an object of the invention to provide a copying method which makes it possible to reproduce originals at an increased rate.

Another object of the invention is to provide a copying method which allows the operating speed to be increased by separating at least one of the operations of a reproduction system from at least one other operation.

An additional object of the invention is to provide a copying method which enables the operating speed to be increased by separating at least the scanning and checking operations of a reproduction system from one another.

A further object of the invention is to provide a copying method which permits the operating speed to be increased while, at the same time, creating the possibility of observing a corrected or modified image on a monitor.

It is also an object of the invention to provide a copying apparatus which is capable of reproducing originals at an inreased rate.

Still another object of the invention is to provide a copying apparatus which allows at least one operation of a reproduction process to be separated from at least one other operation to thereby increase the operating speed.

A concomitant object of the invention is to provide a copying apparatus which enables at least the scanning and checking operations of a reproduction process to be separated from one another to thereby increase the operating speed.

An additional object of the invention is to provide a copying apparatus which not only can operate at relatively high speeds but simultaneously allows an image which has been corrected or modified in an image processor to be viewed on a monitor.

The preceding objects, as well as others which will become apparent as the description proceeds, are achieved by the invention.

One aspect of the invention resides in a method of copying originals. The method comprises the steps of scanning a first original, e.g., electrooptically, generating raw imaging signals based on the scanning step, transmitting the raw signals along a predetermined path, and storing the raw signals in a first part of the path. The signals are corrected or modified, preferably electronically, in a second part of the path downstream of the first part and the corrected signals are stored in a third part of the path downstream of the second part. The corrected signals are converted into a printable image in a fourth part of the path downstream of the third part.

The scanning step may involve scanning the original along rows and columns or point-by-point.

The method may further comprise the step of converting at least a portion of the corrected signals into a video image for observation, e.g., on a monitor. This portion of the corrected signals is advantageously stored at a location other than the third part of the path prior to the step of converting such portion of the corrected signals into a video image.

The method may additionally include the step of printing the printable image on photographic copy material. The printing step is preferably performed using a cathode ray beam.

According to a further embodiment of the method according to the invention, the scanning, generating, transmitting and correcting steps, as well as the steps of storing the corrected signals in a third part of the path and converting the corrected signals into a printable image, are repeated for a second original which is next in line after the first original. However, contrary to the raw imaging signals for the first original, the raw imaging signals for the second original are not stored in the first part of the path but, rather, at a location other than the first part of the path. The path may be provided with a branch having a first end upstream of the first part and a second end between the first and second parts, and the raw imaging signals for the second original may be stored in this branch. The storage area or memory for the raw signals of the second original is here connected in parallel with the storage area or memory for the raw signals of the first original. It is further possible for the raw signals of the second original to be stored in a fifth part of the path upstream of the second part. In this case, the storage areas for the raw signals of the first and second originals are connected in series. This embodiment of the invention allows the operation of loading the raw imaging signals into a memory to be separated from the operation of correcting or modifying the signals.

A portion of the corrected signals for the second original may again be converted into a video image. As before, such portion is advantageously stored at a location other than the third part of the path prior to conversion.

The path may be provided with a second branch which branches off between the second and third parts thereof and the method may comprise the additional step of diverting the portion of the corrected signals to be converted into a video image into the second branch. This portion of the corrected signals is then converted into a video image in a first section of the second branch. As mentioned earlier, such portion of the corrected signals is advantageously stored before undergoing conversion, and the step of storing this portion of the corrected signals may be performed in a second section of the second branch upstream of the first section. Since the video image may have a lower resolution than the image to be printed, less data is required to form the video image than the image to be printed. Accordingly, the storage capacity of the second section of the second branch is preferably less than the storage capacity of the third part of the path and is adjusted to the representation of the video image, e.g., as seen on a monitor in the first section of the second branch. The method may also comprise the step of processing the portion of the corrected signals to be converted into a video image in a third section of the second branch upstream of the first section. When the video image is to be viewed on a monitor, the processing step may function to adjust the video image to the monitor.

An important advantage of the method according to the invention is that the operation of reading in or loading the data carried by the imaging signals may be separated from exposure of the image by the printer, i.e., from the printing operation, so that the two procedures may be performed simultaneously. This allows the operating speed to be increased. Separation of the loading and printing operations is made possible by the intermediate storage of the imaging signals in the first and third parts of the path.

Furthermore, the method of the invention permits the image which has been corrected in the second part of the path to be visually checked using a standard monitor. For a colored original and image, the corrections carried out in the second part of the path may serve to adapt the imaging signals for reproduction of the image on color negative paper. If the thus-corrected imaging signals were used to from a video image on a monitor, color errors may arise in the monitor. The processing step performed in the monitor channel or second branch of the path makes it possible to compensate for these color errors.

Another aspect of the invention resides in an apparatus for copying originals. The apparatus comprises means for scanning an original and generating raw imaging signals, and means defining a predetermined path for the raw signals. A first memory is disposed in the path and serves to store the raw signals. Means for correcting the raw signals, e.g., an electronic image processing unit, is located in the path downstream of the first memory, and a second memory for storing corrected signals issuing from the correcting means is arranged in the path downstream of the correcting means. Means for converting the corrected signals into a printable image, e.g., a CRT (cathode-ray tube) printer, is disposed in the path downstream of the second memory.

The scanning means may be designed to scan an original along rows and columns or point-by-point.

The apparatus may further comprise a monitor for visual observation of the corrected image. A third memory may be located between the correcting means and the monitor and is advantageously connected in parallel with the second memory.

The apparatus amy also include an additional memory for raw imaging signals. The additional memory may be connected in either parallel or series with the first memory. When a series of originals is to be copied, the first and additional memories may be used to store the raw imaging signals from alternate originals, e.g., the first memory may store the signals from odd originals of the series while the additional memory may store the signals from even originals of the series. This enables the scanning operation to be separated from the operation of correcting the imaging signals.

The apparatus of the invention is particularly well-suited for carrying out the method of the invention and is capable of providing further advantages with respect to operating speed.

The novel features which are considered as characteristic of the invnetion are set forth in particular in the appended claims. The improved copying method, as well as the construction and mode of operation of the improved copying apparatus, together with additional features and advantages thereof, will, however, be best understood upon perusal of the following detailed description of certain specific embodiments with reference to the accompanying drawing.

BRIEF DESCRIPTION OF THE DRAWING

The single FIGURE is a block diagram of a copying apparatus in accordance with the invention.

DESCRIPTION OF THE PREFERRED EMBODIMENTS

The FIGURE illustrates a color image reproduction system or apparatus, that is, a system for producing a colored image of a colored original on color copy material. The system may, for instance, be used for positive-positive reproduction of colored originals or for the production of colored photographic positive images from colored negatives.

The basic construction of the reproduction system will be described first. As shown in the FIGURE, the system may be divided into three main components 1,2,3. The component 1 comprises a scanner designed to scan a colored original in each of the three primary colors red, green and blue (RGB). The scanner 1 here includes a horizontally oriented linear CCD (charge-coupled device) sensor arranged to scan the original at a multiplicity of points disposed in rows and columns. To this end, the CCD sensor is moved across the original in a vertical direction (the scanning direction). The scanner 1 generates electrical imaging signals for each scanned point of the original, i.e., each image point. It will be seen that the scanner 1 functions to scan the original electrooptically. Scanning of the original is performed successively for the three primary colors red, green, blue. This is accomplished by pivoting appropriate color filters into the optical path between the CCD sensor or light source and the original. The original is scanned along 1024 rows and at 2048 points per row so that a total of 2048×1024 image elements (pixels) are associated with the original in each of the three primary colors. A conventional, non-illustrated correction circuit is provided to eliminate errors specific to the CCD sensor, e.g., errors due to dark currents and different sensitivities of the CCD elements. The thus-corrected imaging signals, which are in the form of analog signals, are digitized and averages are taken across each row thereby reducing the initial 2048 pixels per row to 1536.

The raw imaging signals present after digitization and averaging are introduced into the component 2 of the color image reproduction system. The component 2, which is indicated by a dash-and-dot line, constitutes an image processor in which the raw imaging signals undergo electronic image processing. For details of the image processor 2 and the electronic processing of the imaging signals therein, reference may be had to the commonly-owned U.S. patent application Ser. No. 085,865 of Hermann Fuchsberger et al. filed Aug. 14, 1987 for METHOD OF AND APPARATUS FOR ELECTRONIC CONTRAST ENHANCEMENT OF REPRODUCTIONS OF TWO-DIMENSIONAL TRANSPARENT ORIGINAL IMAGES.

The third main component of the color image reproduction system, namely, the component 3, constitutes a device for producing an image of the original. The device 3 is here in the form of a CRT (cathode-ray tube) printer which functions to convert the electrical imaging signals into a printable optical image and to print this image on photographc copy material, e.g., color negative paper. The printer 3 forms the optical image point-by-point or pixel-by-pixel via electrooptical transformation of the imaging signals. In principle, then, an imaging signal associated with a given pixel can be subjected to image processing and subsequently printed on the copy material at a location corresponding to the coordinates of the pixel on the original.

The scanner 1 and printer 3 are connected to one another by one or more conductors 12 which pass through the image processor 2 and define a predetermined electrical path for the imaging signals generated by the scanner 1.

The image processor 2 comprises an electronic image processing unit 4 in which the actual electronic processing, i.e., correction or modification, of the imaging signals takes place. The image processing unit 4 may be externally controlled by means of a keyboard 5. A first memory 6 is connected in series with the processing unit 4 upstream of the latter while a second memory 7 which is independent of the memory 6 is disposed downstream of the processing unit 4 in series therewith. The first memory 6 functions to store the raw imaging signals entering the image processor 2 and the second memory 7 functions to store the corrected imaging signals issuing from the processing unit 4. An image which has been loaded into the first memory 6 can be automatically or interactively processed by the processing unit 4 in real time.

The raw image originally contained in the memory 6 is corrected or modified in the processing unit 4 and, from there, loaded into the second memory 7. The memory 7 then contains the corrected or modified color image which is to be printed by the printer 3. The provision of the memory 7 allows the image processing operation to be separated from the printing operation. Thus, while the corrected image is being recalled from the memory 7 by the printer 3, a new image can simultaneously be loaded into the memory 6 and processed by the processing unit 4. This enables the cycle time to be reduced and the operating speed to be significantly increased.

It is further possible to separate the operation of loading an image into the image processor 2 from the image processing operation. In other words, it is possible to load image number n+1 into the image processor 2 while image number n−1 is being printed and image number n is undergoing image processing. This may be accomplished by providing a third or additional memory 8 for raw imaging signals entering the image processor 2. The third memory 8 may be connected in series with the first memory 6 as indicated by the broken lines. Alternatively, the third memory 8 may be connected in parallel with the first memory 6 as shown in full lines. In this case, the memory 8 is disposed in a branch 13 of the electrical path defined by the conductors 12. The branch 13 has a first end upstream of the first memory 6 and a second end between the first memory 6 and the processing unit 4. As new images enter the image processor 2, consecutive images are alternately loaded into and, likewise, alternately recalled from, the first and third memories 6 and 8. The first and third memories 6,8 can also be used with advantage for iterative image processing in situations where the imaging signals are successively passed through the processing unit 4 two or more times. The memory 6 or the memory 8 is then loaded with imaging signals which have been corrected or modified in the processing unit 4.

The electrical path defined by the conductors 12 is provided with a second branch or monitor channel 14 which branches off between the processing unit 4 and the second memory 7. The monitor channel 14 includes a fourth memory 9, a printer-specific image processing unit 10 disposed downstream of the memory 9 as considered in a direction away from the conductors 12, and a standard monitor 11 located downstream of the printer-specific image processing unit 10. The corrected or modified image contained in the second memory 7 can be transferred into the fourth memory 9 and, from the latter, sent to the processing unit 10 for printer-specific processing. The image issuing from the processing unit 10 is converted into a video image by the monitor 11 for visual observation and control. Since the image on the monitor 11 has a substantially lower resolution than the image which is printed by the printer 3, the capacity of the fourth memory 9 may be substantially smaller than the capacities of the first, second and third memories 6,7,8. Preferably, the capacity of the fourth memory 9 is tailored to the representation of the image produced in the monitor 11. The additional processing unit 10 in the monitor channel 14 causes the video image which is formed on the monitor 11 to correspond closely to the final color image produced on the copy material by the printer 3. Due to the lower resolution of the monitor 11, only the color balance, color saturation and global contrast (not the microcontrasts) of the image can be judged.

The capacity of each of the memories 6,7,8 which serve to store a complete image is $1536 \times 1024 \times 8$ bits for each of the three primary color components red, green, blue, i.e., 36 Mbits for a complete color image. In contrast, by virtue of the lower resolution of the image formed on the monitor 11, a capacity of $768 \times 512 \times 8$ bits per color component suffices for the memory 9.

The memory arrangement described above makes it possible to rapidly process a series of high-resolution images represented by digital signals while, at the same time, allowing low-resolution viewing of the images on a monitor. The image times or pixel times associated with the representation of an image may be different depending upon whether the representation is a high-resolution or low-resolution representation. Moreover, the administration of memories in accordance with the invention permits the three main stages of image processing, namely, loading of the image, correction of the image and printing of the image, to be separated from one another.

Without further analysis, the foregoing will so fully reveal the gist of the present invention that others can, by applying current knowledge, readily adapt it for various applications without ommiting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of copying originals, comprising the steps of scanning at least one original; generating raw imaging signals based on the scanning step; transmitting said raw signals along a predetermined path; storing said raw signals in a first part of said path; correcting said raw signals in a second part of said path downstream of said first part; converting a portion of the corrected signals into a video image; storing the corrected signals in a third part of said path downstream of said second part; converting said corrected signals into a printable image in a fourth part of said path downstream of said third part; printing said printable image in said fourth part to produce a printed image, said fourth part including a printer; and subjecting said portion of the corrected signals to printer-specific processing so as to cause said video image to correspond to said printed image, the subjecting step being performed prior to the step of converting said portion of the corrected signals into said video image.

2. The method of claim 1, further comprising the step of storing said first portion of said corrected signals at a location other than said third part of said path prior to the step of converting said portion of said corrected signals into a video image.

3. The method of claim 1, wherein the correcting step is performed electronically.

4. The method of claim 1, wherein the scanning step is performed point-by-point.

5. The method of claim 1, wherein the printing step is performed using a cathode ray beam.

6. The method of claim 1, wherein each of said steps other than the step of storing said raw signals in said first part of said path is performed for an additional original, the raw signals for said additional original being stored prior to the correcting step for said additional original at a location other than said first part of said path.

7. The method of claim 6, said path being provided with a branch having a end upstream of said first part and a second end between said first and second parts; and wherein the raw signals for said additional original are stored in said branch.

8. The method of claim 6, wherein the raw signals for said additional original are stored in another part of said path upstream of said second part.

9. The method of claim 1, wherein said path is provided with a branch between said second and third parts of said path; said method further comprising diverting said portion of said corrected signals into said branch, said portion of said corrected signals being converted into said video image in a first section of said branch.

10. The method of claim 9, further comprising the step of storing said portion of said corrected signals in a second section of said branch upstream of said first section.

11. The method of claim 10, wherein said second section of said branch has a smaller storage capacity than said first and third parts of said path.

12. The method of claim 10, wherein the subjecting step is performed in a third section of said branch upstream of said first section.

13. An apparatus for copying originals, comprising means for scanning an original and generating imaging signals; means defining a predetermined path for the signals; a first memory in said path for storing raw imaging signals; means in said path downstream of said first memory for correcting the raw signals; means for converting a portion of the corrected signals issuing from said correcting means into a video image; a second memory in said path downstream of said correcting means for storing the corrected signals issuing from said correcting means; means including a printer in said path downstream of said second memory for converting the corrected signals into a printable image and producing a printed image therefrom; and printer-specific processing means for processing the portion of the corrected signals, said processing means being designed to cause the video image to correspond to the printed image.

14. The apparatus of claim 13, wherein said means for converting the portion of the corrected signals comprises a monitor.

15. The apparatus of claim 14, further comprising a third memory between said correcting means and said monitor.

16. The apparatus of claim 13, wherein said correcting means is electronic.

17. The apparatus of claim 13, wherein said scanning means is designed to scan an original point-by-point.

18. The apparatus of claim 13, wherein said printer comprises a CRT printer.

19. The apparatus of claim 13, further comprising an additional memory for storing raw imaging signals.

20. The apparatus of claim 19, wherein said additional memory is connected in parallel with said first memory.

21. The apparatus of claim 19, wherein said additional memory is connected in series with said first memory.

22. The apparatus of claim 13, wherein said path is provided with a branch downstream of said correcting means, said processing means and said means for converting the portion of the corrected signals being located in said branch.

23. The apparatus of claim 22, further comprising a third memory in said branch.

24. The apparatus of claim 23, wherein said third memory has a smaller capacity than said first and second memories.

25. The apparatus of claim 23, wherein said processing means is disposed between said correcting means and said means for converting the portion of the corrected signals, said third memory being disposed between said correcting means and said processing means.

* * * * *